United States Patent [19]

Wood

[11] Patent Number: 5,694,137
[45] Date of Patent: Dec. 2, 1997

[54] COMMUNICATION DEVICE ANTENNA SHIELD

[76] Inventor: Richard L. Wood, 4031 SW. 32 Ct., Hollywood, Fla. 33023

[21] Appl. No.: 417,193

[22] Filed: Apr. 5, 1995

[51] Int. Cl.$^6$ ..................................................... H01Q 1/24
[52] U.S. Cl. ............................ 343/702; 343/841; 455/89
[58] Field of Search ........................... 343/702, 841, 343/872, 873; 250/519.1; 455/89, 90; H01Q 1/24

[56] References Cited

U.S. PATENT DOCUMENTS

| | | | |
|---|---|---|---|
| 5,012,114 | 4/1991 | Sisson, Jr. | 250/519.1 |
| 5,134,802 | 8/1992 | Cogan et al. | 43/107 |
| 5,335,366 | 8/1994 | Daniels | 343/702 |
| 5,338,896 | 8/1994 | Danforth | 343/841 |
| 5,373,304 | 12/1994 | Nolan et al. | 343/702 |

FOREIGN PATENT DOCUMENTS

| | | | |
|---|---|---|---|
| 94-19841 | 9/1994 | WIPO | H01Q 1/24 |

*Primary Examiner*—Hoanganh T. Le

[57] ABSTRACT

A shield for blocking radiation emanating from an antenna within a predetermined radial spectrum. The inventive device includes an arcuate shield positionable along an exterior of an antenna. A securing mechanism is coupled to the shield for securing a position thereof relative to the antenna such that radiation is excluded from a predetermined radial spectrum to protect a head of a user from the radiation.

1 Claim, 4 Drawing Sheets

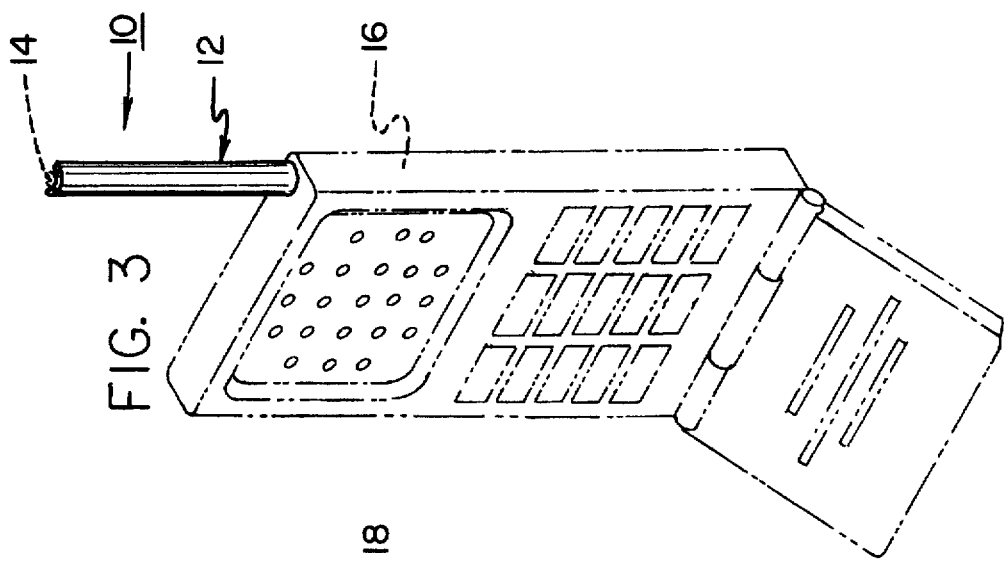
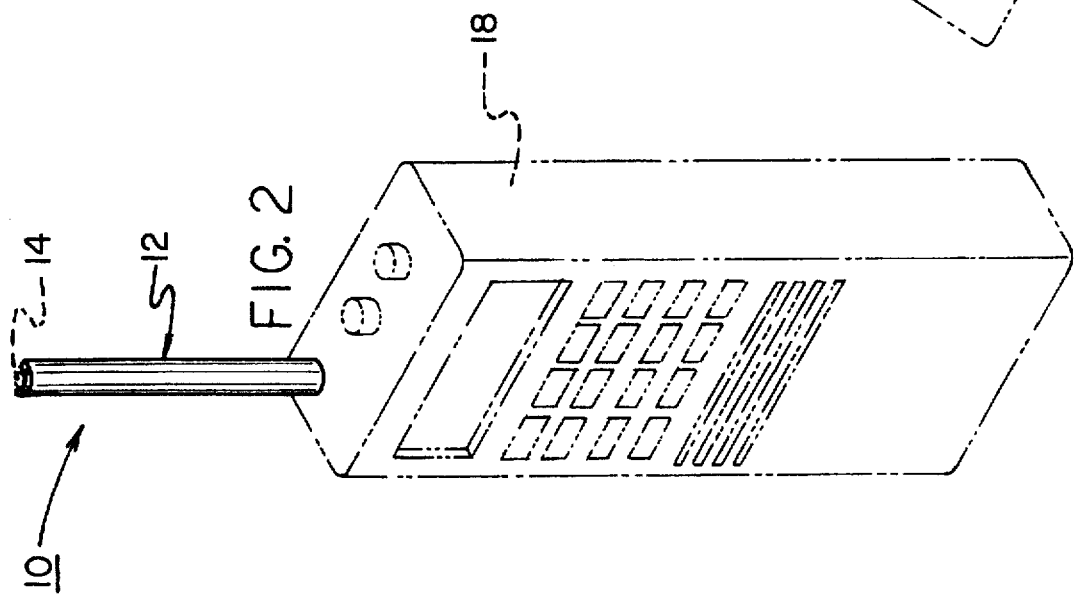
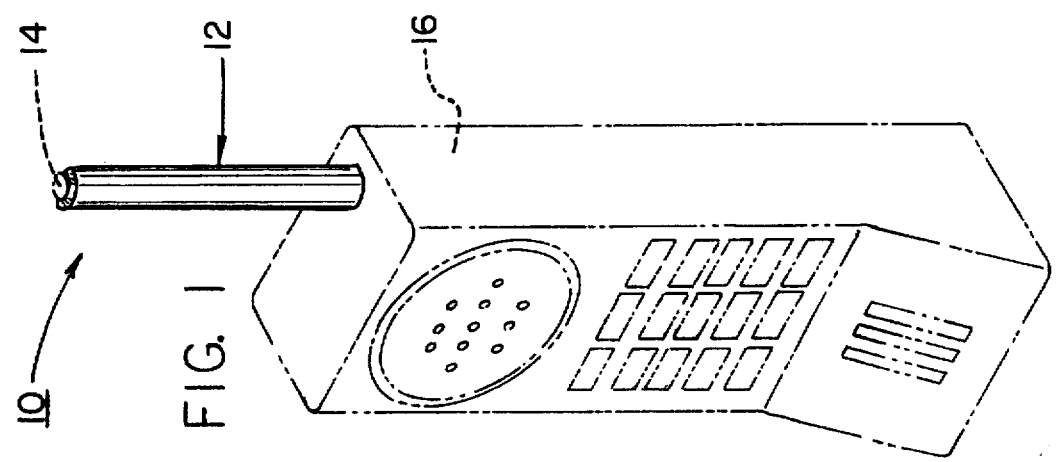

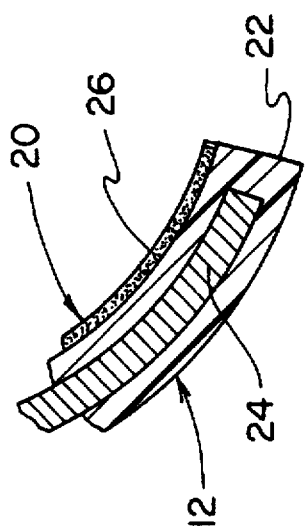
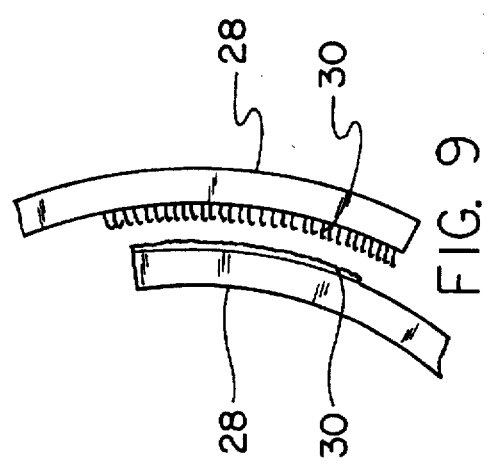
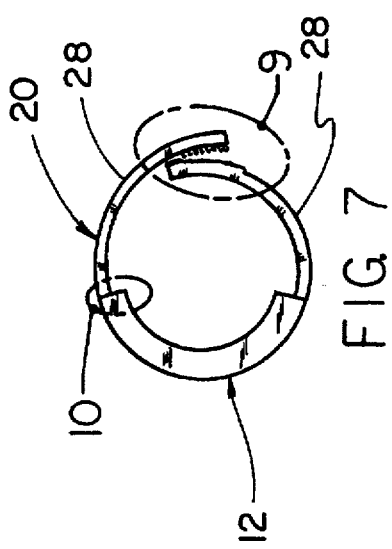
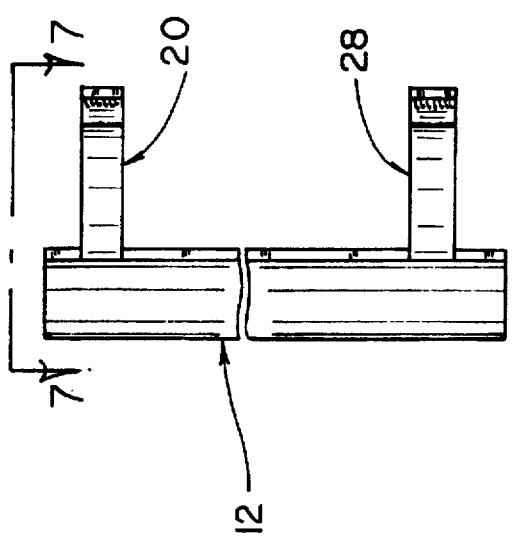
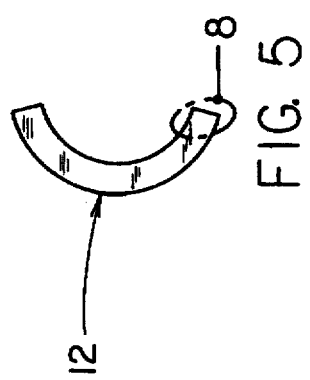

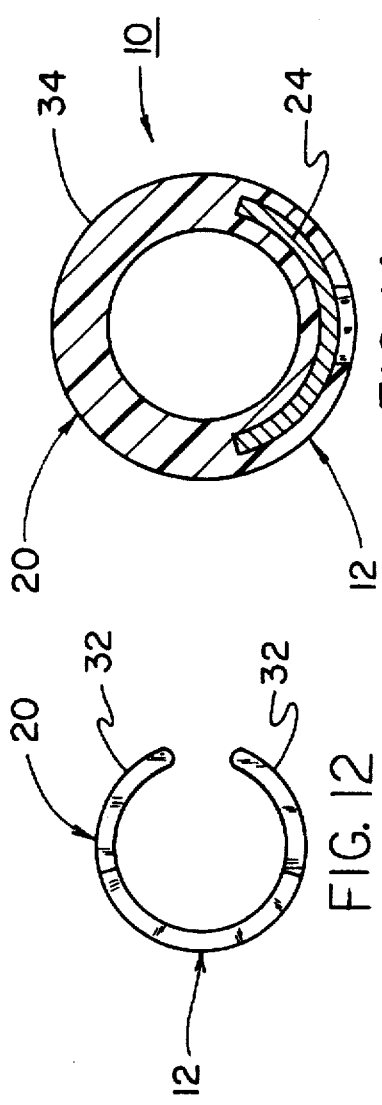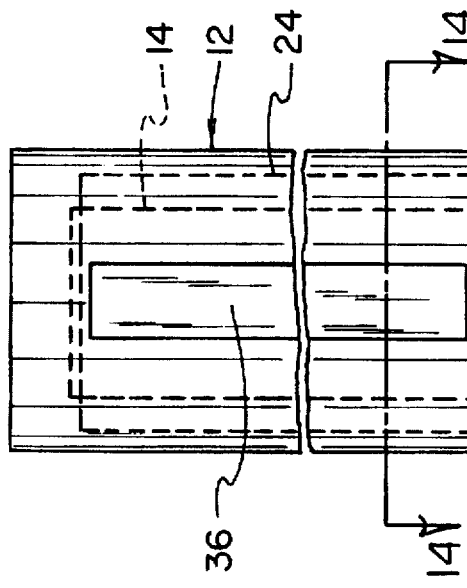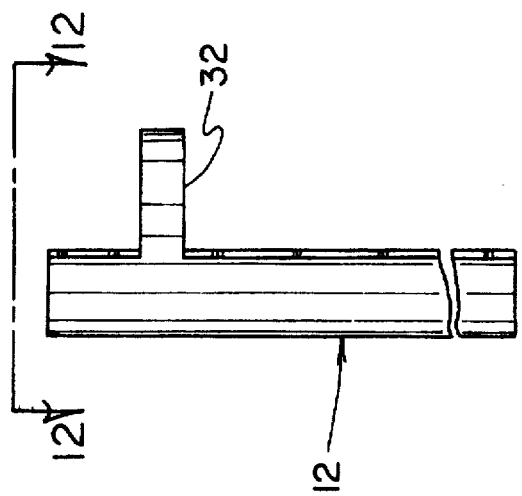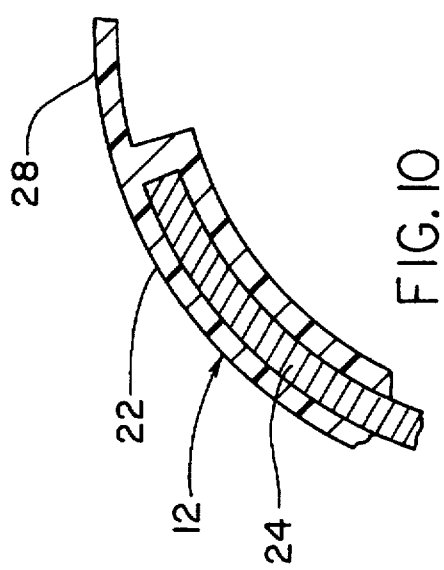

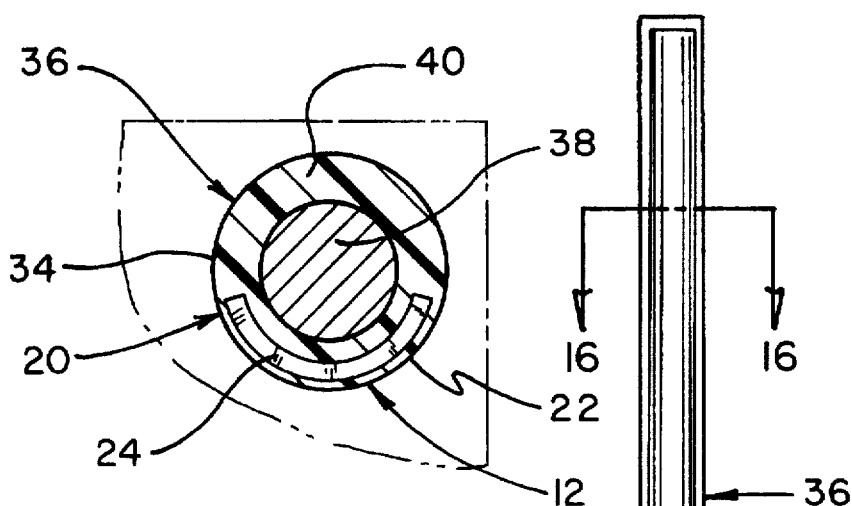
FIG. 16
FIG. 15
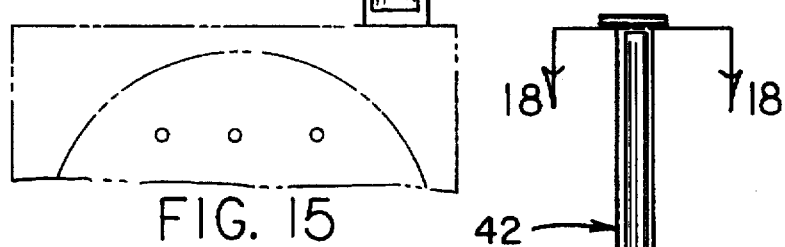
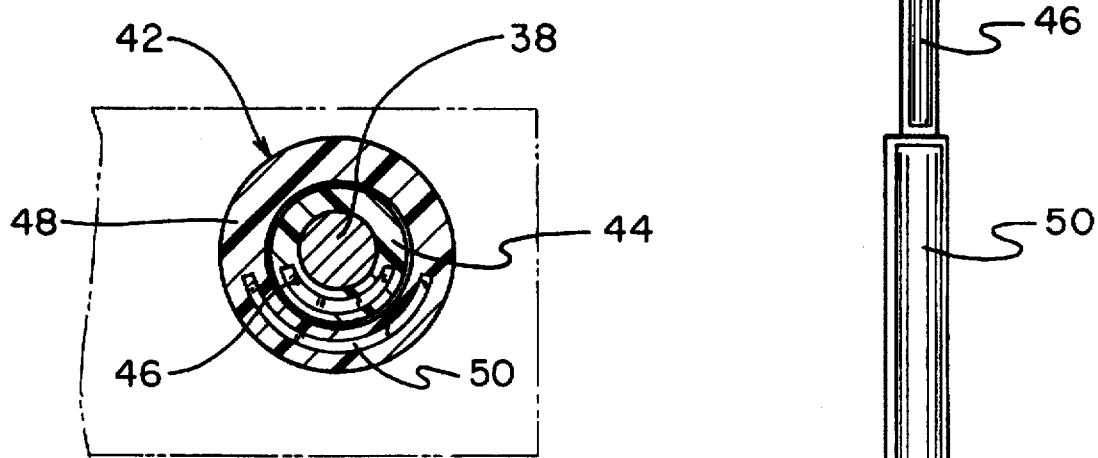
FIG. 18
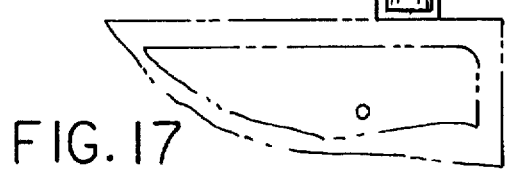
FIG. 17

COMMUNICATION DEVICE ANTENNA SHIELD

BACKGROUND OF THE INVENTION

1. Field of the Invention

The present invention relates to radiation shielding devices and more particularly pertains to an communication device antenna device for blocking radiation emanating from an antenna within a predetermined radial spectrum.

2. Description of the Prior Art

The use of radiation shielding devices is known in the prior art. More specifically, radiation shielding devices heretofore devised and utilized are known to consist basically of familiar, expected and obvious structural configurations, notwithstanding the myriad of designs encompassed by the crowded prior art which have been developed for the fulfillment of countless objectives and requirements.

While the prior art radiation shielding devices fulfill their respective, particular objectives and requirements, the prior art does not disclose a communication device antenna device for blocking radiation emanating from an antenna within a predetermined radial spectrum which includes an arcuate shield positionable along an exterior of an antenna, and a securing means coupled to the shield for securing a position thereof relative to the antenna such that radiation is excluded from a predetermined radial spectrum to protect a head of a user from the radiation.

In these respects, the communication device antenna device according to the present invention substantially departs from the conventional concepts and designs of the prior art, and in so doing provides an apparatus primarily developed for the purpose of blocking radiation emanating from an antenna within a predetermined radial spectrum.

SUMMARY OF THE INVENTION

In view of the foregoing disadvantages inherent in the known types of radiation shielding devices now present in the prior art, the present invention provides a new communication device antenna device construction wherein the same can be utilized for blocking radiation from a communication device within a predetermined radial spectrum. As such, the general purpose of the present invention, which will be described subsequently in greater detail, is to provide a new communication device antenna device apparatus and method which has many of the advantages of the radiation shielding devices mentioned heretofore and many novel features that result in a communication device antenna device which is not anticipated, rendered obvious, suggested, or even implied by any of the prior art radiation shielding devices, either alone or in any combination thereof.

To attain this, the present invention generally comprises a shield for blocking radiation emanating from an antenna within a predetermined radial spectrum. The inventive device includes an arcuate shield positionable along an exterior of an antenna. A securing means is coupled to the shield for securing a position thereof relative to the antenna such that radiation is excluded from a predetermined radial spectrum to protect a head of a user from the radiation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new communication device antenna device apparatus and method which has many of the advantages of the radiation shielding devices mentioned heretofore and many novel features that result in a communication device antenna device which is not anticipated, rendered obvious, suggested, or even implied by any of the prior art radiation shielding devices, either alone or in any combination thereof.

It is another object of the present invention to provide a new communication device antenna device which may be easily and efficiently manufactured and marketed.

It is a further object of the present invention to provide a new communication device antenna device which is of a durable and reliable construction.

An even further object of the present invention is to provide a new communication device antenna device which is susceptible of a low cost of manufacture with regard to both materials and labor, and which accordingly is then susceptible of low prices of sale to the consuming public, thereby making such communication device antenna devices economically available to the buying public.

Still yet another object of the present invention is to provide a new communication device antenna device which provides in the apparatuses and methods of the prior art some of the advantages thereof, while simultaneously overcoming some of the disadvantages normally associated therewith.

Still another object of the present invention is to provide a new communication device antenna device for blocking radiation emanating from an antenna within a predetermined radial spectrum.

Yet another object of the present invention is to provide a new communication device antenna device which includes an arcuate shield positionable along an exterior of an antenna, and a securing means coupled to the shield for securing a position thereof relative to the antenna such that radiation is excluded from a predetermined radial spectrum to protect a head of a user from the radiation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a communication device antenna device according to the present invention in use.

FIG. 2 is a further isometric illustration of the device in use.

FIG. 3 is yet a further isometric illustration of the present invention in use.

FIG. 4 is a side elevation view of the present invention including a first form of a securing means.

FIG. 5 is a top plan view taken from line 5—5 of FIG. 4.

FIG. 6 is a side elevation view of the present invention including a second form of the securing means.

FIG. 7 is a top plan view taken from line 7—7 of FIG. 6.

FIG. 8 is an enlarged cross sectional view of the area set forth in FIG. 5.

FIG. 9 is an enlarged top plan view of the area set forth in FIG. 7.

FIG. 10 is a cross sectional view of the area set forth in FIG. 7.

FIG. 11 is a side elevation view of the invention including a third form of the securing means.

FIG. 12 is a top plan view taken from line 12—12 of FIG. 11.

FIG. 13 is a side elevation view of the invention including a fourth form of the securing means.

FIG. 14 is a cross sectional view taken along line 14—14 of FIG. 13.

FIG. 15 is a front elevation view of the invention including the fourth form of the securing means integrally formed within an antenna.

FIG. 16 is a cross sectional view taken along line 16—16 of FIG. 15.

FIG. 17 is a front elevation view of the present invention integrally formed into a telescoping shielded antenna.

FIG. 18 is a cross sectional view taken along line 18—18 of FIG. 17.

DESCRIPTION OF THE PREFERRED EMBODIMENT

With reference now to the drawings, and in particular to FIGS. 1–18 thereof, a new communication device antenna device embodying the principles and concepts of the present invention and generally designated by the reference numeral 10 will be described.

More specifically, it will be noted that the communication device antenna device 10 comprises a shielding means 12 for positioning along an exterior of an antenna 14 and for shielding or blocking radiation emanating from the antenna within a predetermined radial spectrum, as shown in FIGS. 1 through 3 of the drawings. The present invention 10 may be utilized with a cellular phone 16, as shown in FIGS. 1 and 3, or any other communication device such as the communication radio 18 illustrated in FIG. 2 which produces or radiates electromagnetic or radio frequency radiation. A securing means 20 is coupled to the shielding means 12 for selectively securing the shielding means to the antenna 14. By this structure, an individual utilizing the device 10 in combination with a communication device such as the cellular phone 16 or communication radio 18 illustrated in FIGS. 1 through 3 of the drawings is protected from receiving radiating emanating therefrom.

Referring now to FIG. 8, it can be shown that the shielding means 12 according to the present invention 10 preferably comprises an arcuate exterior body 22 having an arcuate shielding plate 24 extending through a center of the arcuate exterior body. The arcuate exterior body 22 and the arcuate shielding plate 24 are concentrically oriented and preferably extend through an arc of less than one-hundred and eighty degrees. The arcuate shielding plate 24 is preferably constructed of a material substantially impervious to radiation emanating from the antenna 14, such as lead or suitable alloys thereof. By this structure, the shielding means 12 can be positioned so as to reside between the antenna 14 and a head of an individual utilizing the communication device so as to preclude transmission of radiation directed towards the individual's head.

Referring now to FIGS. 4 and 5 with concurrent reference to FIG. 8, it can be shown that a first form of the securing means 20 may comprise an adhesive 26 applied to an interior surface of the arcuate exterior body 22 for coupling the exterior body to the exterior of an antenna 14. To this end, a pressure sensitive adhesive 26 is preferably utilized and initially covered with a removable backing such that an end user of the device 10 can simply remove the removable backing and apply the present invention 10 to the antenna 14 whereby coupling of the adhesive 26 therewith is allowed to occur.

As shown in FIGS. 6, 7, and 9, a second form of the securing means 20 may comprise a plurality of securing straps 28 extending from diametrically opposed lateral edges of the shielding means 12. The securing straps 28 extend therefrom and terminate in outer distal ends whereat cooperative hook and loop material 30 (see FIG. 9) is secured permitting removable coupling of the outer distal ends of the securing straps together. By this structure, the shielding means 12 can be easily fitted to and secured to a variety of disparate antenna shapes to impart a universal fit to the present invention Referring now to FIGS. 11 and 12, it can be shown that a third form of the securing means 20 may comprise a plurality of arcuate clip arms 32 extending from diametrically opposed sides of the shielding means 12. The arcuate clip arms 32 are constructed of a substantially resilient material permitting outward deformation thereof during lateral positioning of the shielding means 12 onto an associated antenna 14. The arcuate clip arms 32 will then resiliently contract about the antenna 14 so as to secure the shielding means 12 relative thereto through a frictional engagement with the antenna.

As shown in FIGS. 13 and 14, a fourth form of the securing means 20 may comprise a semi-cylindrical member 34 extending between diametrically opposed longitudinal edges of the shielding means 12 so as to define a substantially cylindrical shape of the device 10 including the fourth form the securing means 20. In this alternative form of the present invention 10, a viewing window 36 is preferably directed through the arcuate exterior body 22 of the shielding means 12 so as to permit a visual ascertaining of an alignment of the arcuate shielding plate 24 therewithin. Thus, an individual utilizing the present invention 10 including the fourth form of the securing means 20 to utilize the viewing window 36 to align the arcuate shielding plate 24 so as to reside between the antenna 14 and the user's head.

Referring now to FIGS. 15 and 16, it can be shown that the fourth form of the securing means 20 can be integrally formed with an antenna so as to define a shielded antenna 36. To this end, a conductive antenna core 38 extends through an antenna casing 40 formed in both the semi-cylindrical member 34 of the securing means 20 and the arcuate exterior body 22 of the shielding means 12. As shown in FIGS. 17 and 18, the invention 10 can also be realized in a telescoping shielded antenna 42 in which the antenna core 38 extends through an inner antenna casing 44 having an inner arcuate shielding plate 46, and further extends through an outer antenna casing 48 having an outer arcuate shielding plate 50 extending therethrough.

In use, the communication device antenna shield 10 according to the present invention can be easily utilized to effect shielding of electromagnetic or radio frequency radiation emanating from an antenna 14 of a communication device such as a cellular phone 16 or communication radio 18. The present invention 10 serves to substantially eliminate the reception of radiation into a head of a user so as to reduce a risk of tissue damage thereto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A communication device antenna shield, comprising:

a shielding means comprising an arcuate exterior body having an arcuate shielding plate concentrically oriented, the arcuate shielding plate extending through an arc of less than about one hundred and eighty degrees around a center of the arcuate exterior body;

a securing means comprising a semi-cylindrical member extending between diametrically opposed longitudinal edges of the shielding means, wherein an antenna can be positioned between the semi-cylindrical body and the arcuate exterior body of the shielding means such that the securing means and the shielding means surround the antenna while blocking less than one hundred and eighty degrees of the radial spectrum of radiation from the antenna; and a viewing window directed through the arcuate exterior body of the shielding means so as to permit a visual ascertaining of an alignment of the arcuate shielding plate therewithin relative to the antenna.

* * * * *